(12) United States Patent
Tessier et al.

(10) Patent No.: US 9,654,171 B2
(45) Date of Patent: May 16, 2017

(54) APPARATUS AND METHOD FOR JOINTLY SELECTING THE TAP VALUES AND DELAYS OF THE FINGERS FOR A RAKE RECEIVER OF TWO CARRIERS

(71) Applicant: Telefonaktiebolaget L M Ericsson (publ), Stockholm (SE)

(72) Inventors: Stéphane Tessier, Stockholm (SE); Bo Lyckegård, Torslanda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/773,842

(22) PCT Filed: Aug. 30, 2013

(86) PCT No.: PCT/SE2013/051016
§ 371 (c)(1),
(2) Date: Sep. 9, 2015

(87) PCT Pub. No.: WO2014/163544
PCT Pub. Date: Oct. 9, 2014

(65) Prior Publication Data
US 2016/0036488 A1    Feb. 4, 2016

Related U.S. Application Data

(60) Provisional application No. 61/808,786, filed on Apr. 5, 2013.

(51) Int. Cl.
*H04B 1/7117* (2011.01)
*H04L 25/02* (2006.01)
(Continued)

(52) U.S. Cl.
CPC ........ *H04B 1/7117* (2013.01); *H04J 11/0063* (2013.01); *H04L 25/0202* (2013.01); *H04J 2011/0009* (2013.01); *H04W 88/08* (2013.01)

(58) Field of Classification Search
CPC . H04B 1/7117; H04L 25/0202; H04J 11/0063
See application file for complete search history.

(56) References Cited

U.S. PATENT DOCUMENTS

2011/0043386 A1*  2/2011  Kong ................. H04B 1/70757
341/24

FOREIGN PATENT DOCUMENTS

WO           04002038  A1    12/2003

OTHER PUBLICATIONS

International Search Report and Written Opinion dated Oct. 30, 2013 for International Application Serial No. PCT/SE2013/051016, International Filing Date: Aug. 30, 2013 consisting of 13-pages.
(Continued)

*Primary Examiner* — Jaison Joseph
(74) *Attorney, Agent, or Firm* — Patent Portfolio Builders, PLLC

(57) ABSTRACT

The present disclosure concerns receivers for use in nodes or devices that participate in wireless communications. In one exemplary embodiment, the receiver receives a first signal attributable to a first carrier and a second signal attributable to a second carrier. A first path searcher detects taps in the first signal attributable to the first carrier. A second path searcher detects taps in the second signal attributable to the second carrier. A channel tap selector selects, based on received energy values for taps detected by the first path searcher and the second path searcher, which tap values are to be used for taps of the receiver for both the first carrier and the second carrier.

20 Claims, 5 Drawing Sheets

(51) Int. Cl.
   *H04J 11/00*     (2006.01)
   *H04W 88/08*     (2009.01)

(56) References Cited

OTHER PUBLICATIONS

Wei Yang et al.: "Performance Analysis of MT-CDMA System with Antenna Array in a Multipath Fading Channel", Wireless Personal Communications, Kluwer Academic Publishers, vol. 41(3):427-446, XP019509779, ISSN: 1572-834 Publication Date: May 2007, Article Date: Aug. 2006 (Aug. 16, 2006) consisting of 13-pages.
Besma Smida et al.: "A Spectrum-Efficient Multicarrier CDMA Array-Receiver with Diversity-Based Enhanced Time and Frequency Synchronization", IEEE Transactions on Wireless Communications, IEEE Service Center, Piscataway NJ, US, vol. 6(6):2315-2327, XP011185971, ISSN: 1536-1276, DOI: 10.1109/TWC.2007.05842 Jun. 1, 2007, consisting of 20-pages.

* cited by examiner

APPARATUS AND METHOD FOR JOINTLY SELECTING THE TAP VALUES AND DELAYS OF THE FINGERS FOR A RAKE RECEIVER OF TWO CARRIERS

TECHNICAL FIELD

The technology presented herein generally relates to receivers for use in nodes or devices that participate in wireless communications. More particularly, the technology presented herein relates to such receivers which are configured to receive signals over plural carriers. More specifically, some embodiments described herein relate to apparatuses and methods for receiving continuous adjacent carriers.

BACKGROUND

In a typical cellular radio system, wireless terminals (also known as mobile stations and/or user equipment units (UEs)) communicate via a radio access network (RAN) to one or more core networks (CN). The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The Universal Terrestrial Radio Access Network (UTRAN) is essentially a radio access network using wideband code division multiple access (WCDMA) for user equipments (UEs), or user equipment units. In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are defined for the 3$^{rd}$ Generation Partnership Project (3GPP).

The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways(AGWs)) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

The International Telecommunications Union-Radio communications sector (ITU-R) has specified a set of requirements for 4G standards, named the International Mobile Telecommunications Advanced (IMT-Advanced) specification. ITU-R has also stated that Mobile WiMAX and LTE, as well as other beyond-3G technologies that do not fulfill the IMT-Advanced requirements, could nevertheless be considered "4G", provided they represent forerunners to IMT-Advanced compliant versions and have a substantial level of improvement in performance and capabilities with respect to the initial third generation system.

The nodes and devices, such as base stations and wireless terminals, which participate in wireless communications generally employ a communication interface that typically includes a transmitter and a receiver, and one or more antenna(s) that may connect to both the transmitter and the receiver. In some technologies such as multiple input multiple output (MIMO) one or both of the node(s) and device(s) participating in the wireless communications have plural antenna.

A baseband receiver, which may be found in a wireless terminal or a network node such as a base station in WCDMA technology, may apply an equalizer to compensate for dispersivity of the channel. The dispersivity may be a result of receiving multiple reflections of the same transmitted signal, which may resemble several echoes of a same source. Those reflections are also known as channel "taps".

The baseband receiver may employ a "path searcher" to find the channel taps. A reference signal sent by the source is generally correlated at the receiver to a known pattern to identify the delays of the different taps. More particularly, the 'path searcher' finds the channel taps by integrating energy (i.e., correlation of the known reference and signal and summation) of the continuously transmitted reference signal. The detection of the channel taps decides if the receiver is declared to be in synchronization, e.g., in "sync" state. The receiver, e.g., path searcher, generally detects some of the delays, may miss some of the delays, and may even add extra delays on its own even though it does not detect the reference signal. Since each tap generally fades during the transmission independently of the other taps, some taps will be too weak for the receiver to detect. The delays selected by the receiver are called "fingers". When the fingers have been selected, the data signal can be decoded at each finger and combined together by an equalizer such as MMSE (Minimum-Mean-Square-Error), Rake or GRake, for example. Generally, the data part of the channel is not processed until the sync-state is achieved.

The procedure of detecting the taps can take time, but the channel taps are generally required to process data transmitted over the channel. Ideally, the path searcher would track the channel continuously in order to catch all channel taps where the energy is present, but in reality this would take or consume more time and resources. Thus the path searcher might not be run continuously, which can lead to missing a channel tap. Furthermore, since the channel is generally changing during the detection procedure, the path searcher may have to estimate the time interval during which the integration is performed. This also can lead to missing some channel taps.

In some networks it is possible to transmit and receive over plural carriers or sub-carriers, e.g., over plural carrier frequencies. In such networks information is typically transmitted over the air interface between base stations and wireless terminal in units such as a frame which is formatted in such a manner to be understood by both the base station and the wireless terminals. In some radio access technologies, a frame (or subframe) is conceptualized as comprising a two dimensional array or "resource grid" of resource elements (RE) The resource elements are generally arranged in symbol order along a first (horizontal) direction and according to frequency subcarrier along a second (vertical) direction.

Two carrier frequencies are considered to be adjacent if they are quite close to each other, i.e., typically 20 MHz from each other. As used herein, the criteria for adjacency is as follows: When a transmitter sends two signals simultaneously, one on each frequency (i.e., one on the primary frequency and one of the adjacent frequency), the channels that each signal will experience will have different fast fading tracks, but the channel taps will most likely be the same or at least belong to the same delay spread interval.

In a multi-carrier network, a same tap may be a strong tap in one of the adjacent carriers but weak in the other of the adjacent carriers. This can result in missing a tap that could become stronger later on. Missing a finger or tap can have the consequence of not being able to reach the targeted SIR (i.e., Signal-to-Interference Ratio) and thus leading to power rushes.

SUMMARY

It is in view of the above considerations and others that the various embodiments disclosed herein have been made.

In one of its aspects, the technology presented herein concerns a receiver for a device of a telecommunications network. The device may be a network node, such as a base station. Alternatively, the device may be a wireless terminal, such as a UE.

The receiver is configured to receive a first signal attributable to a first carrier and a second signal attributable to a second carrier. Also, the receiver comprises a first path searcher configured to detect taps in the first signal attributable to the first carrier. Moreover, the receiver comprises a second path searcher configured to detect taps in the second signal attributable to the second carrier. A channel tap selector is configured to select, based on received energy values for taps detected by the first path searcher and the second path searcher, which tap values are to be used for taps of the receiver for both the first carrier and the second carrier.

The above-mentioned first and second carriers may be continuous and adjacent carriers.

In some embodiments, the channel tap selector may be configured to select the highest received energy values for taps of the receiver for both the first carrier and the second carrier.

In some embodiments, the first path searcher may include a first list of taps, wherein each tap of the first list of taps has a respective energy value. Furthermore, the second path searcher may include a corresponding second list of taps, wherein each tap of the second list of taps has a corresponding respective energy value. The channel tap selector may be configured to select the taps with the highest energy values over the two lists of taps detected separately on the first carrier and the second carrier, respectively, such that the energy value on the carrier having the highest energy value is selected for each tap.

In one embodiment, the receiver is comprised in a network node. For example, the network node may be a base station.

In another embodiment, the receiver may be comprised in a wireless terminal.

In another of its aspects, the technology presented herein concerns a method performed by a receiver for a device of a telecommunications network. The receiver comprises a first path searcher, a second path searcher, and a channel tap selector. The method comprises receiving, by means of the receiver, a first signal attributable to a first carrier and a second signal attributable to a second carrier. The method further comprises detecting, by means of the first path searcher, taps in the first signal attributable to the first carrier. Moreover, the method comprises detecting, by means of the second path searcher, taps in the second signal attributable to the second carrier. Still further, the method comprises selecting, by means of the channel tap selector and based on received energy values for taps detected by the first path searcher and the second path searcher, which tap values are to be used for taps of the receiver for both the first carrier and the second carrier.

The above-mentioned first and second carriers may be continuous and adjacent carriers.

The method may comprises selecting, by means of the channel tap selector, the highest received energy values for taps of the receiver for both the first carrier and the second carrier.

In some embodiments, the first path searcher includes a first list of taps, wherein each tap of the first list of taps has a respective energy value; and the second path searcher includes a corresponding second list of taps, wherein each tap of the second list of taps has a corresponding respective energy value. The method may additionally comprise selecting, by means of the channel tap selector, the taps with the highest energy values over the two lists of taps detected separately on the first carrier and the second carrier, respectively, such that the energy value on the carrier having the highest energy value is selected for each tap.

In yet another of its aspects, the technology disclosed herein concerns a node or device of a telecommunications network. The node or device comprises a finger selector (a.k.a. channel tap selector) configured to determine, based on the received energy values for the taps detected by path searchers for continuous adjacent carriers, which delay values (or, tap values) are to be used for the fingers (or, taps) of the receiver for both the first carrier and the second (adjacent) carrier. In other words, the finger selector is configured to determine what channel taps are to be used for processing the data stream part of either carrier.

In one example embodiment, the finger selector is configured to use, for both carriers (i.e. the first carrier and the second (adjacent) carrier), all of the delay positions which are chosen by the path searchers on the basis of energy. That is, all the channel taps chosen in the 'select taps' should be used to produce the data stream of the first carrier as well as used to produce a completely different data stream on the second carrier, it being kept in mind that the data streams of both carriers are originated from same producer and/or source.

Criteria other than energy could optionally also be employed. Such other criteria could e.g. be that when all taps for one carrier is lost because of fading, then processing continues with the latest active delay position for a while until either new active channel taps are found or some time-threshold decides that the 'radio-link is lost'. If two carriers are used, in an example embodiment channel taps for the non-lost carrier could be used if the lost carrier has no active taps.

In another example embodiment, the finger selector may be configured to select the taps with the highest energy (e.g., correlation value) over the two lists of taps detected separately on each carrier. In an example embodiment, if a tap delay appears in both carriers, the value on the carrier where the highest energy is observed is advantageously chosen for that tap. The delay of the tap may be used to decide which delay should be used to despread data of either and/or both carrier(s) separately.

The technology disclosed herein also is directed to the receivers themselves, and to methods of operating such nodes/devices and receivers.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
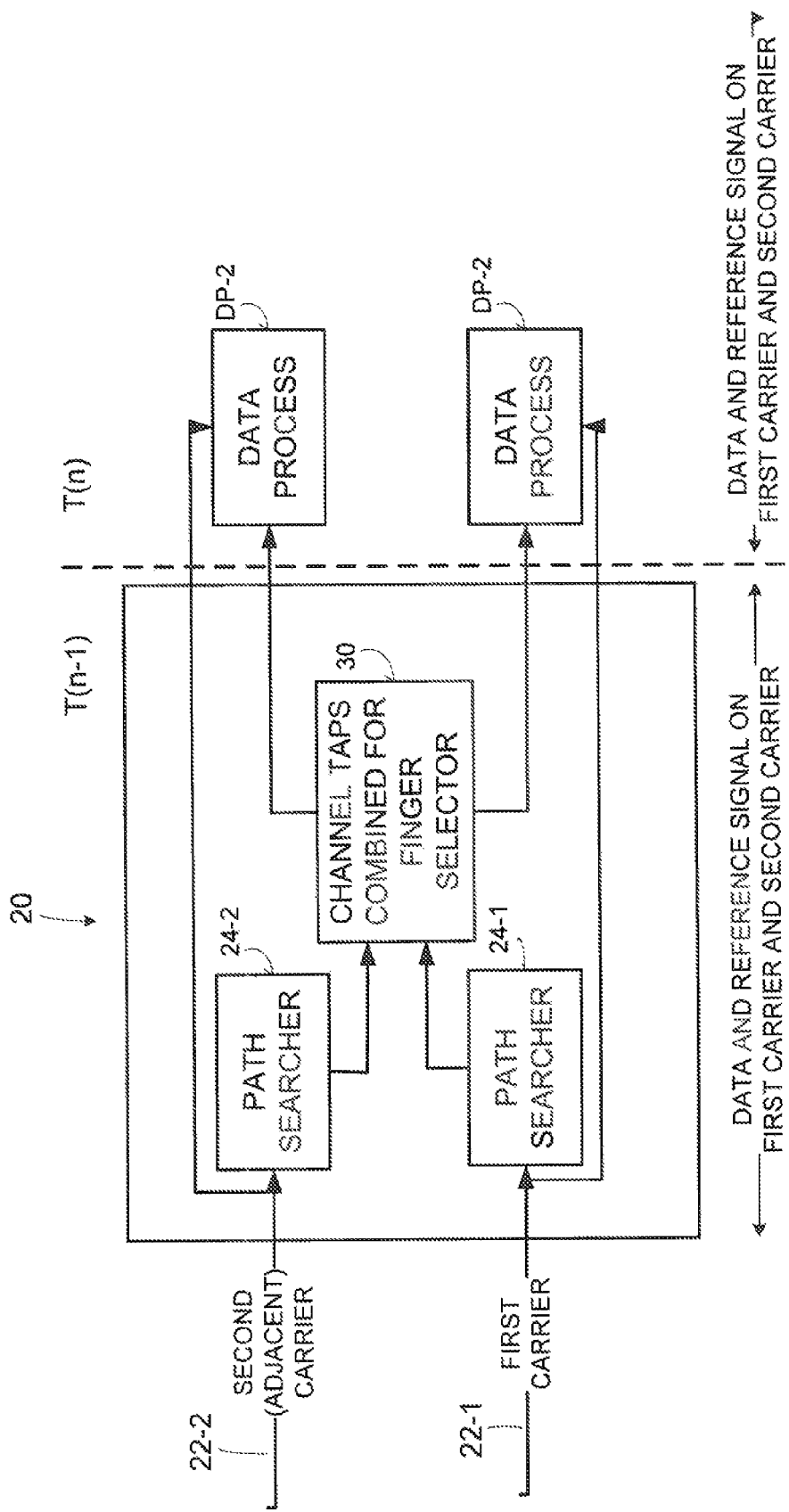
FIG. 1 is a diagrammatic view of selected functionalities of a receiver according to an example embodiment.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network.

As used herein, the term "node" may encompass nodes using any technology including, e.g., high speed packet access (HSPA), long term evolution (LTE), code division multiple access (CDMA)2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

FIG. 1 illustrates, in simplified form, a receiver 20 which is configured to receive a signal 22-1 attributable to a first carrier. The receiver 20 is also configured to receive a signal 22-2 attributable to a second carrier. The second carrier is adjacent to the first carrier. As used herein, the first carrier and the second carrier can be said to be both adjacent (as explained above) and continuous. "Continuous" means that the carriers transmit their reference signal continuously, or essentially continuously.

The receiver 20 comprises a first path searcher 24-1 configured to detect taps in the signal 22-1 attributable to the first carrier. The receiver 20 further comprises a second path searcher 24-2 configured to detect taps in the signal 22-2 attributable to the second carrier. Each path searcher 24, to detect the taps, typically correlates the received signal, which is generally the sum of the reference signal and the data signal, with a known pattern transmitted by a reference signal. The correlation is performed for each delay belonging to a certain maximum range, where the granularity could be a fraction of the length of a chip or symbol. The path searcher will then pick the delays that have high correlation level.

In general, an adjacent carrier will have the same tap delays as its counterpart but the same tap in each of the carriers will generally experience uncorrelated fading. Depending on the Doppler of the channel, some of the taps might have faded away and may not be selected by the respective path searcher 24.

Figure 2:
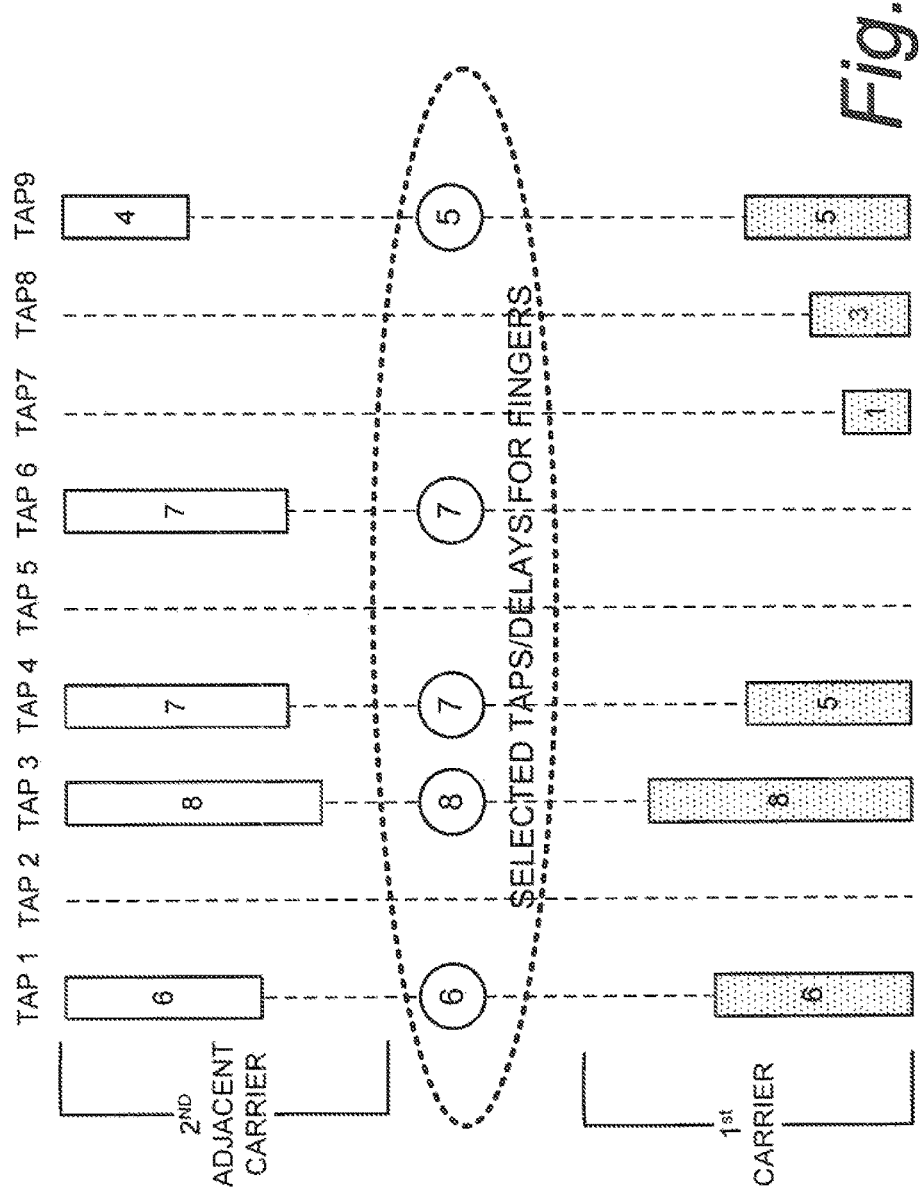
FIG. 2 is a diagrammatic view showing plural taps detected by path searchers of two continuous adjacent carriers and selection by a finger selector (a.k.a. channel tap selector) of taps or delays to be used with respect to both of the continuous adjacent carriers.

FIG. 2 illustrates an example scenario of tap detection for two path searchers, e.g., for path searcher 24-1 and path searcher 24-2 of FIG. 1. For sake of simplicity, FIG. 2 shows a possibility of nine taps or delays for both path searcher 24-1 and path searcher 24-2. It will be appreciated that the number of such taps or delays is not critical, and that in an actual embodiment the number may preferably be on the order of from about one to about sixteen, but could also range from about one to about one hundred or more, for example. It is preferable, but not required, to choose the same taps or delays for both the first carrier and the second carrier. Each tap or delay in FIG. 2 is represented by a dashed vertical line. Superimposed on some of the vertical "tap" lines of FIG. 2 are rectangles which represent energy values detected by the respective path searchers 24. The rectangles representing the energy values for the respective taps or delays detected by the first path searcher 24-1 are shown with dotted or stippled interiors; the rectangles representing the energy values for the respective taps or delays detected by the second path searcher 24-2 are shown with clear interiors. The length of each of the rectangles is proportional to the received energy value, and a relative number depicting the received energy value is displayed in the interior of each rectangle. For the first carrier, the first path searcher 24-1 detects taps 1, 3, 4, 7, 8, and 9, those taps having respective energy values of 6, 8, 5, 1, 3, and 5. For the second carrier, the second path searcher 24-2 detects taps 1, 3, 4, 6, and 9, those taps having respective energy values of 6, 8, 7, 7, and 4. As mentioned above, depending on the Doppler of the channel, some of the taps might have faded away and are not be selected, or detected, by the respective path searcher. For example, in FIG. 2 tap 6 of the first carrier has faded away and is not detected by path searcher 24-1.

In one of its aspects, the receiver 20 is configured to receive the first signal 22-1 attributable to the first carrier and the second signal 22-2 attributable to the second carrier. The first and second carriers may be continuous adjacent carriers. The first path searcher 24-1 is configured to detect taps in the first signal 22-1 attributable to the first carrier. Moreover, the second path searcher 24-2 is configured to detect taps in the second signal 22-2 attributable to the second carrier. A channel tap selector 30 (or, finger selector) is configured to select, based on received energy values for taps detected by the first path searcher and the second path searcher, which tap values are to be used for taps of the receiver for both the first carrier and the second carrier. For example, the channel tap selector may be configured to select the highest received energy values for taps of the receiver 20 for both the first carrier and the second carrier. In one embodiment, the first path searcher may include a first list of taps, wherein each tap of the first list of taps has a respective energy value. Furthermore, the second path searcher may include a corresponding second list of taps, wherein each tap of the second list of taps has a corresponding respective energy value. The channel tap selector may then be configured to select the taps with the highest energy values over the two lists of taps detected separately on the first carrier and the second carrier, respectively, such that the energy value on the carrier having the highest energy value is selected for each tap.

Thus, the technology disclosed herein enables merging of the delays detected from the path searcher on both carriers, e.g., merging the delays detected by the first path searcher 24-1 and the second path searcher 24-2. To this end, FIG. 1 shows the receiver 20 as further comprising finger selector 30 which is configured to combine or merges the channel taps. The finger selector 30 may also be known as the channel tap selector. By "combining" or "merging" the channel taps is meant that the finger selector 30 determines, based on the received energy values for the taps detected by path searcher 24-1 and path searcher 24-2, which delay values (or tap values) are to be used for the fingers (or, taps) of the receiver for both the first carrier and the second (adjacent) carrier. In this regard, the finger selector 30 may be configured to select the taps with the highest energy (e.g., correlation value) over the two lists of taps detected separately on each carrier.

In the example of FIG. 2, the list from the first path searcher 24-1 includes taps 1, 3, 4, 7, 8, and 9 having respective energy values of 6, 8, 5, 1, 3, and 5; the list from the second path searcher 24-2 includes taps 1, 3, 4, 6, and 9 having respective energy values of 6, 8, 7, 7, and 4. For the example scenario of FIG. 2, the oval shown by broken lines depicts which taps are actually selected by finger selector 30 for use by the receiver fingers in processing both the data received on the first carrier signal and the data received on the second carrier signal. In the example scenario, the finger selector 30 has selected taps 1, 3, 4, 6, and 9, as depicted by circles which are superimposed near a vertical center of the respective vertical tap lines. Each circle has a circumscribed number which represents the energy level attributable to the respective tap. For the example show, the respective energy levels for selected taps 1, 3, 4, 6, and 9 are 6, 8, 7, 7, and 5. The energy levels are measured in dBm, e.g. integrated coherent and non-coherent energy per delay.

FIG. 1 overlays, on the functional operations, a broken line demarcation which depicts data processing relative to frame numbers. The right-hand side of the broken line of FIG. 1 depicts data processing at frame n based on paths detected in frame n−1. In time T(n−1) the old selection of rake fingers (e.g., channel taps) are used and in the time T(n) the new selection of channel taps are used. In view of the fact that both of the adjacent carriers are continuous, for both adjacent carriers the reference signals and data signals are available in frame n and in frame n−1.

From the forgoing it will be seen that, at least in an example embodiment, if a tap delay appears in both carriers, the value on the carrier where the highest energy is observed is chosen for that tap.

Fading on one carrier is typically independent of fading on another carrier. As shown and described above, when one or some or all candidates (i.e. candidate taps) are missing in an adjacent carrier, the finger selector 30 can use combinations of the candidates of both carriers to make its selection. This may be the true even though some fingers (or, taps) have no (or few) energy units in the other carrier. It may be that for those fingers (or, taps) that presently have no or few energy units, the finger (or, channel tap) may fade up, e.g., increase, after a while.

Figure 3:
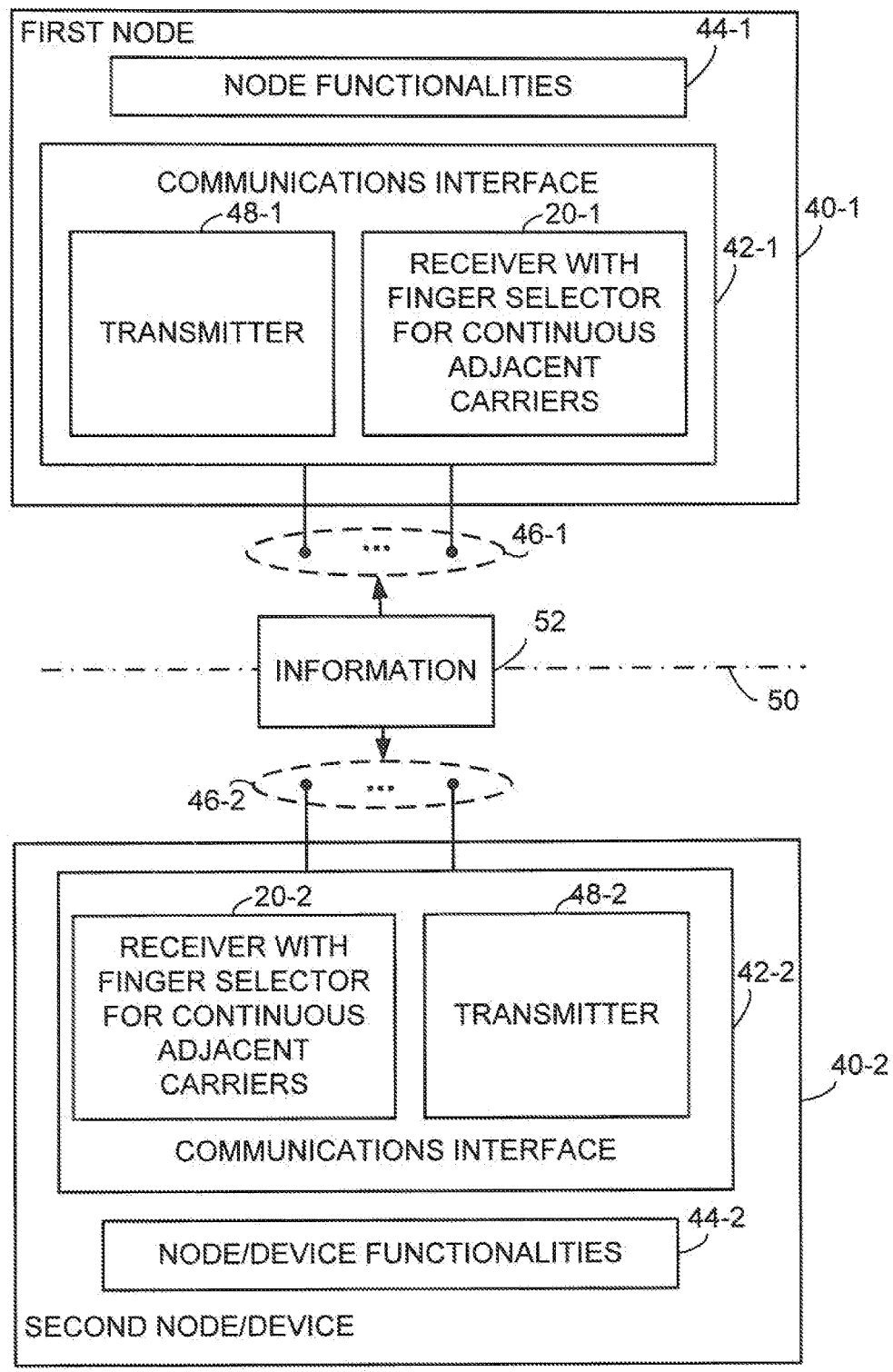
FIG. 3 is a schematic view depicting various example embodiments of a telecommunications network wherein the receivers described herein may be employed.

FIG. 3 illustrates a first node 40-1 and a second node or device 40-2. Each node/device 40 comprises communications interface 42 and various node/device functionalities 44. Each communications interface 42 cooperates with one or more antenna(s) 46, and typically comprises both transmitter 48 and receiver 20. The first node 40-1 and the second node/device 40-2 communicate over an air or radio interface 50. Such communication may occur using "frames" 52 of information which are transmitted using plural carriers, such as the aforementioned first carrier and the adjacent second carrier.

It should be understood, particularly with reference to FIG. 3, that the receiver 20 which selects fingers for continuous adjacent carriers in the manner described herein or otherwise encompassed hereby may be in a network node or in another device such as a wireless terminal. For example, in one example scenario of FIG. 1 the first node 40-1 may be a base station and the second node/device 40-2 may be a wireless terminal. In another example scenario the first node 40-1 may be a relay base station and the second node/device 40-2 may be another base station.

Figure 4:
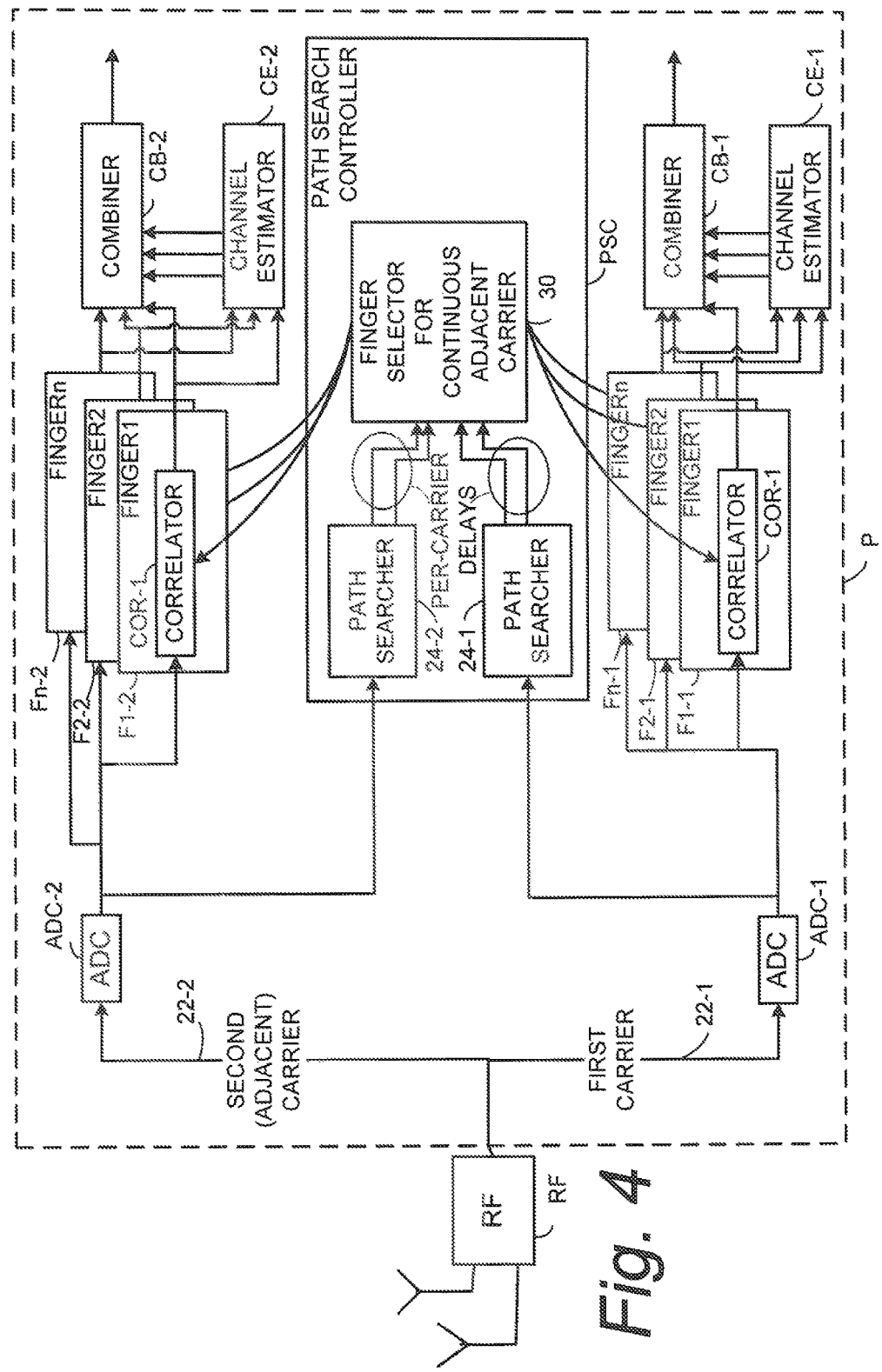
FIG. 4 is a schematic view of a more detailed example embodiment of a receiver which implements a finger selector which merges delays from plural continuous adjacent carriers.

FIG. 4 illustrates an example receiver 20 in more detail according to one example, non-limiting embodiment. The receiver 20 of FIG. 4 comprises a RF processing unit RF which forwards the signals 22-1 attributable to the first carrier and the signals 22-2 attributable to the second carrier to respective analog to digital conversion units ADC. The digitally converted signals for each carrier are applied both to respective path searchers 24 and to correlators COR associated with each finger F, an integer number n of such fingers being illustrated in FIG. 4. The fingers F may be rake fingers. The path searcher 24 may comprise matched filters which receive the digitally converted signals and an impulse response measurement unit IMR. The impulse response measurement unit of the path searchers 24 perform a channel impulse response measurement using correlators that correlate the received signal with a known reference code sequence (e.g., scrambling code) such as a pilot channel code. The path searchers 24 may perform the correlation piece-wise during intervals where the channel does not vary much, since the channel may change during a full sequence of the reference code. The path searchers 24 may generate the tap lists as a result of the correlation for taps which have energy values which exceed a given threshold. The pathsearchers 24 create a power-delay-profile (pdf), where power level per delay is placed (a vector with power values per carrier). Channel taps (fingers/delays) are selected if fingers are local maximum as well as over a threshold. The threshold is generally a level above a noise level. Generally, channel taps are also needed to be separated a predetermined about, e.g., ¾chip, between each (for one carrier), to assure an independence between channel taps.

The tap lists generated by the path searchers 24 may be applied to finger selector 30. The path searchers 24 and finger selector 30 may comprise a path search controller PSC. The finger selector 30 may select taps or delays for processing by the correlators COR of the fingers F in the manner described herein (see, e.g., FIG. 2), and may notify the fingers F of both carriers of such selection. Output signals from the correlator COR of the fingers F for each carrier may be applied both to a channel estimator CE for the respective carrier and a combiner CB for the respective carrier. The combiner may combine the outputs of the correlators COR of the fingers F in known manner.

In an example embodiment and as depicted by way of example in FIG. 4, the finger selector 30 may be realized by a machine platform. To this end FIG. 4 employs a broken line to represent machine platform P which comprises finger selector 30 and other functional units of receiver 20 as well. The terminology "machine platform" is a way of describing how the functional units of receiver 20 can be implemented or realized by machine. The machine platform P can take any of several forms, such as for example electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform P may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable for transmission mode selector 40 is that of a hardware circuit, e.g., an application specific integrated circuit (ASIC) wherein circuit elements are structured and operated to perform the various acts described herein.

The technology disclosed hereinabove thus improves the detection because it combines the delays that are strongest in their respective carrier which implies better estimation per tap. The increased quality of the estimation helps diminishing the impact of the problems otherwise encountered and described above. Combining channel taps from both carriers create an improved, if not optimal, coverage of possible channel taps on both carriers, and improve capacity and/or capability of a receiver such as a WCDMA rake-receiver.

Figure 5:
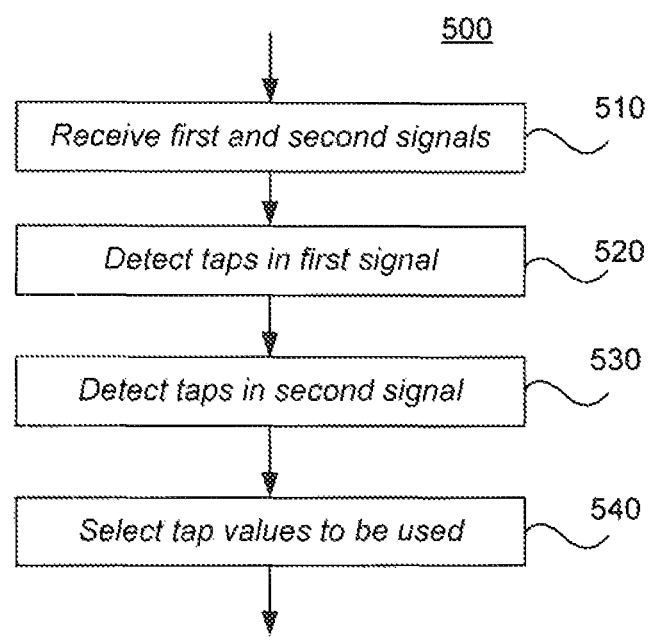
FIG. 5 is a flowchart of a method according to an example embodiment.

FIG. 5 is a flowchart illustrating a method according to an example embodiment. The method may be performed by a receiver, such as the receiver 20 shown in FIG. 1. The receiver comprises a first path searcher, a second path searcher, and a channel tap selector. The receiver receives 510 a first signal attributable to a first carrier and a second signal attributable to a second carrier. The first and second carriers may be continuous and adjacent carriers. Furthermore, the first path searcher detects 520 taps in the first signal attributable to the first carrier. Also, the second path searcher detects 530 taps in the second signal attributable to the second carrier. The channel tap selector (or, finger selector) selects 540 which tap values are to be used for taps of the receiver for both the first carrier and the second carrier. The channel tap selector bases its selection on received energy values for taps detected by the first path searcher and the second path searcher, respectively. In one embodiment, the channel tap selector selects 540 the highest received energy values for taps of the receiver for both the first carrier and the second carrier.

In some embodiments, the first path searcher includes a first list of taps, wherein each tap of the first list of taps has a respective energy value; and the second path searcher includes a corresponding second list of taps, wherein each tap of the second list of taps has a corresponding respective energy value. The method may then comprise selecting 540 the taps with the highest energy values over the two lists of taps detected separately on the first carrier and the second carrier, respectively, such that the energy value on the carrier having the highest energy value is selected for each tap.

The various embodiments described herein may provide several advantages. For example, the various embodiments may allow for an improved detection of channel taps. As such, some embodiments may allow for improving the detection by combining the delays that are strongest in their respective carrier which implies a better estimation per tap. The increased quality of the estimation may diminish any impact from the problems otherwise encountered, which has been described earlier in this disclosure. Combining channel taps from both carriers may create an improved coverage of possible channel taps on both carriers, and in turn improve the capacity and/or the capability of a receiver, such as a WCDMA rake-receiver.

As used herein, "terminal" or "wireless terminal" or "user equipment (UE)" may be a mobile station such as a mobile telephone or "cellular" telephone or a laptop with wireless capability and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

Furthermore, while two continuous adjacent carriers have been illustrated in the example embodiments and description, it should be understood that the technology disclosed herein encompasses merging or combining of more than two continuous adjacent carriers (provided that the carriers are truly adjacent, e.g., the frequencies are sufficiently close to each other).

Although the description above contains many specificities, these should not be construed as limiting the scope of the invention but as merely providing illustrations of some of the presently preferred embodiments of the invention. It will be appreciated that the scope of the present invention fully encompasses other embodiments which may come to mind to those skilled in the art having benefit of the teachings presented herein, and that the scope of the present invention is accordingly not to be limited. In other words, although the present invention has been described with reference to specific embodiments, it is not intended to be limited to the specific form set forth herein and, accordingly, the invention is only limited by the appended claims. To this end, it should be borne in mind that although individual features may be included in different claims, these may possibly be advantageously be combined, and the inclusion of different claims does not imply that a combination of features is not feasible and/or advantageous. Reference to an element in the singular is not intended to mean "one and only one" unless explicitly so stated, but rather "one or more." Also, the terms "comprise/comprises" or "include/includes" do not exclude the presence of other elements or steps. All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A receiver for a device of a telecommunications network, the receiver being configured to receive a first signal attributable to a first carrier and a second signal attributable to a second carrier, the receiver comprising:
   a first path searcher configured to detect taps in the first signal attributable to the first carrier;
   a second path searcher configured to detect taps in the second signal attributable to the second carrier; and
   a channel tap selector configured to select, based on received energy values for taps detected by the first path searcher and the second path searcher, which tap values are to be used for taps of the receiver for both the first carrier and the second carrier.

2. The receiver according to claim 1, wherein the first and the second carriers are continuous and adjacent carriers.

3. The receiver according to claim 1, wherein the channel tap selector is configured to select highest received energy values for taps of the receiver for both the first carrier and the second carrier.

4. The receiver according to claim 1, wherein:
   the first path searcher includes a first list of taps, wherein each tap of the first list of taps has a respective energy value;
   the second path searcher includes a corresponding second list of taps, wherein each tap of the second list of taps has a corresponding respective energy value; and
   the channel tap selector is configured to select the taps with highest energy values over the first and second lists of taps detected separately on the first carrier and the second carrier, respectively, such that the energy value on the carrier having the highest energy value is selected for each tap.

5. The receiver according to claim 1, wherein the receiver is comprised in a network node.

6. The receiver according to claim 5, wherein the network node is a base station.

7. The receiver according to claim 1, wherein the receiver is comprised in a wireless terminal.

8. A method performed by a receiver for a device of a telecommunications network, the receiver comprising a first path searcher, a second path searcher, and a channel tap selector, the method comprising:
   receiving, by the receiver, a first signal attributable to a first carrier and a second signal attributable to a second carrier;
   detecting, by the first path searcher, taps in the first signal attributable to the first carrier;
   detecting, by the second path searcher, taps in the second signal attributable to the second carrier; and
   selecting, by the channel tap selector, and based on received energy values for taps detected by the first path searcher and the second path searcher, which tap values are to be used for taps of the receiver for both the first carrier and the second carrier.

9. The method according to claim 8, wherein the first and the second carriers are continuous and adjacent carriers.

10. The method according to claim 8, further comprising:
    selecting, by the channel tap selector, the highest received energy values for taps of the receiver for both the first carrier and the second carrier.

11. The method according to claim 8, wherein:
    the first path searcher includes a first list of taps, wherein each tap of the first list of taps has a respective energy value; and the second path searcher includes a corresponding second list of taps, wherein each tap of the second list of taps has a corresponding respective energy value; and the method further comprises:

selecting, by the channel tap selector, the taps with highest energy values over the first and second lists of taps detected separately on the first carrier and the second carrier, respectively, such that the energy value on the carrier having the highest energy value is selected for each tap.

12. The receiver according to claim 2, wherein the channel tap selector is configured to select the highest received energy values for taps of the receiver for both the first carrier and the second carrier.

13. The receiver according to claim 2, wherein:

the first path searcher includes a first list of taps, wherein each tap of the first list of taps has a respective energy value;

the second path searcher includes a corresponding second list of taps, wherein each tap of the second list of taps has a corresponding respective energy value; and the channel tap selector is configured to select the taps with highest energy values over the first and second lists of taps detected separately on the first carrier and the second carrier, respectively, such that the energy value on the carrier having the highest energy value is selected for each tap.

14. The receiver according to claim 3, wherein:

the first path searcher includes a first list of taps, wherein each tap of the first list of taps has a respective energy value;

the second path searcher includes a corresponding second list of taps, wherein each tap of the second list of taps has a corresponding respective energy value; and the channel tap selector is configured to select the taps with highest energy values over the first and second lists of taps detected separately on the first carrier and the second carrier, respectively, such that the energy value on the carrier having the highest energy value is selected for each tap.

15. The receiver according to claim 14, wherein the receiver is comprised in a network node.

16. The receiver according to claim 14, wherein the receiver is comprised in a wireless terminal.

17. The receiver according to claim 2, wherein the receiver is comprised in a network node.

18. The method according to claim 9, further comprising:

selecting, by the channel tap selector, the highest received energy values for taps of the receiver for both the first carrier and the second carrier.

19. The method according to claim 9, wherein:

the first path searcher includes a first list of taps, wherein each tap of the first list of taps has a respective energy value; and the second path searcher includes a corresponding second list of taps, wherein each tap of the second list of taps has a corresponding respective energy value; and the method further comprises:

selecting, by the channel tap selector, the taps with highest energy values over the first and second lists of taps detected separately on the first carrier and the second carrier, respectively, such that the energy value on the carrier having the highest energy value is selected for each tap.

20. The method according to claim 10, wherein:

the first path searcher includes a first list of taps, wherein each tap of the first list of taps has a respective energy value; and the second path searcher includes a corresponding second list of taps, wherein each tap of the second list of taps has a corresponding respective energy value; and the method further comprises:

selecting, by the channel tap selector, the taps with highest energy values over the first and second lists of taps detected separately on the first carrier and the second carrier, respectively, such that the energy value on the carrier having the highest energy value is selected for each tap.

\* \* \* \* \*